(12) United States Patent
Lipari et al.

(10) Patent No.: US 7,810,140 B1
(45) Date of Patent: Oct. 5, 2010

(54) SYSTEM, METHOD, AND COMPUTER READABLE MEDIUM FOR PROCESSING A MESSAGE IN A TRANSPORT

(76) Inventors: Paul A. Lipari, 5582 Swisher Cir., Frisco, TX (US) 75034; Thomas T. Wheeler, 7971 Highpoint Ridge, Frisco, TX (US) 75035; John P. Patoskie, 708 Beaumont Ct., Allen, TX (US) 75013

( * ) Notice: Subject to any disclaimer, the term of this patent is extended or adjusted under 35 U.S.C. 154(b) by 1157 days.

(21) Appl. No.: 11/439,059

(22) Filed: May 23, 2006

(51) Int. Cl.
*G06F 7/04* (2006.01)
*H04L 29/06* (2006.01)

(52) U.S. Cl. .............................. 726/4; 713/154; 701/1
(58) Field of Classification Search .................... 726/4; 713/154; 701/1
See application file for complete search history.

(56) References Cited

U.S. PATENT DOCUMENTS

| | | | |
|---|---|---|---|
| 4,714,995 A | 12/1987 | Materna et al. | |
| 5,495,533 A | 2/1996 | Linehan et al. | |
| 5,524,253 A | 6/1996 | Pham et al. | |
| 5,604,800 A | 2/1997 | Johnson et al. | |
| 5,721,912 A | 2/1998 | Stepczyk et al. | |
| 5,778,395 A | 7/1998 | Whiting et al. | |
| 5,812,997 A | 9/1998 | Morimoto et al. | |
| 5,859,911 A * | 1/1999 | Angelo et al. ............... | 713/187 |
| 5,930,798 A | 7/1999 | Lawler et al. | |
| 5,982,891 A | 11/1999 | Ginter et al. | |
| 6,038,500 A | 3/2000 | Weiss | |
| 6,055,562 A | 4/2000 | Devarakonda et al. | |
| 6,065,040 A | 5/2000 | Mima et al. | |
| 6,088,689 A | 7/2000 | Kohn et al. | |
| 6,113,650 A | 9/2000 | Sakai | |
| 6,134,580 A | 10/2000 | Tahara et al. | |
| 6,134,660 A | 10/2000 | Boneh et al. | |
| 6,154,777 A | 11/2000 | Ebrahim | |
| 6,172,986 B1 | 1/2001 | Watanuki et al. | |
| 6,199,195 B1 | 3/2001 | Goodwin et al. | |
| 6,202,060 B1 | 3/2001 | Tran | |
| 6,209,124 B1 | 3/2001 | Vermeire et al. | |
| 6,230,309 B1 | 5/2001 | Turner et al. | |
| 6,233,601 B1 | 5/2001 | Walsh | |
| 6,256,773 B1 | 7/2001 | Bowman-Amuah | |
| 6,272,478 B1 | 8/2001 | Obata et al. | |

(Continued)

FOREIGN PATENT DOCUMENTS

JP    2005190103    7/2005

OTHER PUBLICATIONS

Emmerich, et al., "TIGRA—An Architectural Style for Enterprise Application Integration", *IEEE*, (Jul. 2001),p. 567-576.

(Continued)

*Primary Examiner*—Michael Pyzocha (57) ABSTRACT

A method, system, and computer readable medium for processing a message in a moving transport comprises receiving a message by a message gateway via a message receiver, receiving the message by a security module from the message gateway, validating the message by the security module, where the validating includes at least one of: determining an identity of a sender of the message, and determining that the message sender is allowed to send messages to the transport, receiving the message by a verification module from the security module, and verifying, by the verification module, that the message will be sent to a target module.

30 Claims, 5 Drawing Sheets

U.S. PATENT DOCUMENTS

| | | | |
|---|---|---|---|
| 6,282,563 B1 | 8/2001 | Yamamoto et al. | |
| 6,282,697 B1 | 8/2001 | Fables et al. | |
| 6,304,556 B1 | 10/2001 | Haas | |
| 6,330,677 B1 * | 12/2001 | Madoukh | 726/2 |
| 6,343,265 B1 | 1/2002 | Glebov et al. | |
| 6,349,343 B1 | 2/2002 | Foody et al. | |
| 6,389,462 B1 | 5/2002 | Cohen et al. | |
| 6,438,744 B2 | 8/2002 | Toutonghi et al. | |
| 6,442,537 B1 | 8/2002 | Karch | |
| 6,452,910 B1 | 9/2002 | Vij et al. | |
| 6,477,372 B1 | 11/2002 | Otting | |
| 6,496,871 B1 | 12/2002 | Jagannathan et al. | |
| 6,600,430 B2 | 7/2003 | Minagawa et al. | |
| 6,600,975 B2 | 7/2003 | Moriguchi et al. | |
| 6,611,516 B1 | 8/2003 | Pirkola et al. | |
| 6,629,032 B2 | 9/2003 | Akiyama | |
| 6,629,128 B1 | 9/2003 | Glass | |
| 6,662,642 B2 | 12/2003 | Breed et al. | |
| 6,671,680 B1 | 12/2003 | Iwamoto et al. | |
| 6,687,761 B1 | 2/2004 | Collins et al. | |
| 6,701,381 B2 | 3/2004 | Hearne et al. | |
| 6,714,844 B1 | 3/2004 | Dauner et al. | |
| 6,738,975 B1 | 5/2004 | Yee et al. | |
| 6,744,352 B2 | 6/2004 | Lesesky et al. | |
| 6,744,358 B1 | 6/2004 | Bollinger | |
| 6,744,820 B1 | 6/2004 | Khairallah et al. | |
| 6,768,417 B2 | 7/2004 | Kuragaki et al. | |
| 6,816,452 B1 | 11/2004 | Maehata | |
| 6,831,375 B1 | 12/2004 | Currie et al. | |
| 6,851,108 B1 | 2/2005 | Syme et al. | |
| 6,862,443 B2 | 3/2005 | Witte | |
| 6,876,845 B1 | 4/2005 | Tabata et al. | |
| 6,895,391 B1 | 5/2005 | Kausik | |
| 6,901,588 B1 | 5/2005 | Krapf et al. | |
| 6,904,593 B1 | 6/2005 | Fong et al. | |
| 6,931,455 B1 | 8/2005 | Glass | |
| 6,931,623 B2 | 8/2005 | Vermeire et al. | |
| 6,947,965 B2 | 9/2005 | Glass | |
| 6,951,021 B1 | 9/2005 | Bodwell et al. | |
| 6,957,439 B1 | 10/2005 | Lewallen | |
| 6,963,582 B1 | 11/2005 | Xu | |
| 6,981,150 B2 * | 12/2005 | Little et al. | 713/191 |
| 6,985,929 B1 | 1/2006 | Wilson et al. | |
| 6,993,774 B1 | 1/2006 | Glass | |
| 7,010,689 B1 | 3/2006 | Matyas, Jr. et al. | |
| 7,043,522 B2 | 5/2006 | Olson et al. | |
| 7,047,518 B2 | 5/2006 | Little et al. | |
| 7,055,153 B2 | 5/2006 | Beck et al. | |
| 7,058,645 B2 | 6/2006 | Seto et al. | |
| 7,062,708 B2 | 6/2006 | Mani et al. | |
| 7,069,551 B2 | 6/2006 | Fong et al. | |
| 7,127,259 B2 | 10/2006 | Ueda et al. | |
| 7,127,724 B2 | 10/2006 | Lewallen | |
| 7,146,614 B1 | 12/2006 | Nikols et al. | |
| 7,146,618 B1 | 12/2006 | Mein et al. | |
| 7,172,113 B2 | 2/2007 | Olenick et al. | |
| 7,174,533 B2 | 2/2007 | Boucher | |
| 7,197,742 B2 | 3/2007 | Arita et al. | |
| 7,210,132 B2 | 4/2007 | Rivard et al. | |
| 7,213,227 B2 | 5/2007 | Kompalli et al. | |
| 7,225,425 B2 | 5/2007 | Kompalli et al. | |
| 7,228,141 B2 | 6/2007 | Sethi | |
| 7,231,403 B1 | 6/2007 | Howitt et al. | |
| 7,237,225 B2 | 6/2007 | Kompalli et al. | |
| 7,293,261 B1 | 11/2007 | Anderson et al. | |
| 7,376,959 B2 | 5/2008 | Warshavsky et al. | |
| 7,475,107 B2 | 1/2009 | Maconi et al. | |
| 7,477,897 B2 | 1/2009 | Bye | |
| 7,496,637 B2 | 2/2009 | Han et al. | |
| 7,499,990 B1 | 3/2009 | Tai et al. | |
| 7,502,615 B2 | 3/2009 | Wilhoite et al. | |
| 7,506,309 B2 * | 3/2009 | Schaefer | 717/120 |
| 7,519,455 B2 * | 4/2009 | Weiss et al. | 701/2 |
| 7,566,002 B2 * | 7/2009 | Love et al. | 235/380 |
| 7,643,447 B2 | 1/2010 | Watanuki et al. | |
| 7,660,777 B1 | 2/2010 | Hauser | |
| 7,660,780 B1 | 2/2010 | Patoskie | |
| 7,664,721 B1 | 2/2010 | Hauser | |
| 7,698,243 B1 | 4/2010 | Hauser | |
| 7,702,602 B1 | 4/2010 | Hauser | |
| 7,702,603 B1 | 4/2010 | Hauser | |
| 7,702,604 B1 | 4/2010 | Hauser | |
| 7,774,789 B1 | 8/2010 | Wheeler | |
| 2001/0029526 A1 | 10/2001 | Yokoyama et al. | |
| 2001/0051515 A1 | 12/2001 | Rygaard | |
| 2001/0056425 A1 | 12/2001 | Richard | |
| 2002/0032783 A1 | 3/2002 | Tuatini | |
| 2002/0035429 A1 * | 3/2002 | Banas | 701/115 |
| 2002/0091680 A1 | 7/2002 | Hatzis et al. | |
| 2002/0115445 A1 | 8/2002 | Myllymaki | |
| 2002/0116454 A1 | 8/2002 | Dyla et al. | |
| 2002/0159479 A1 | 10/2002 | Watanuki et al. | |
| 2002/0174222 A1 | 11/2002 | Cox | |
| 2002/0196771 A1 | 12/2002 | Vij et al. | |
| 2003/0009539 A1 | 1/2003 | Hattori | |
| 2003/0018950 A1 | 1/2003 | Sparks et al. | |
| 2003/0023573 A1 | 1/2003 | Chan et al. | |
| 2003/0033437 A1 | 2/2003 | Fischer et al. | |
| 2003/0046377 A1 * | 3/2003 | Daum et al. | 709/223 |
| 2003/0046432 A1 | 3/2003 | Coleman et al. | |
| 2003/0055898 A1 | 3/2003 | Yeager et al. | |
| 2003/0070071 A1 | 4/2003 | Riedel et al. | |
| 2003/0101441 A1 | 5/2003 | Harrison et al. | |
| 2003/0177170 A1 | 9/2003 | Glass | |
| 2003/0191797 A1 | 10/2003 | Gurevich et al. | |
| 2003/0191969 A1 * | 10/2003 | Katsikas | 713/201 |
| 2003/0225789 A1 | 12/2003 | Bussler et al. | |
| 2003/0225935 A1 | 12/2003 | Rivard et al. | |
| 2004/0003243 A1 * | 1/2004 | Fehr et al. | 713/168 |
| 2004/0015539 A1 | 1/2004 | Alegria et al. | |
| 2004/0037315 A1 | 2/2004 | Delautre et al. | |
| 2004/0044985 A1 | 3/2004 | Kompalli et al. | |
| 2004/0044986 A1 | 3/2004 | Kompalli et al. | |
| 2004/0044987 A1 | 3/2004 | Kompalli et al. | |
| 2004/0064503 A1 | 4/2004 | Karakashian et al. | |
| 2004/0078423 A1 | 4/2004 | Satyavolu et al. | |
| 2004/0078687 A1 | 4/2004 | Partamian et al. | |
| 2004/0082350 A1 | 4/2004 | Chen et al. | |
| 2004/0111730 A1 | 6/2004 | Apte | |
| 2004/0133656 A1 | 7/2004 | Butterworth et al. | |
| 2004/0148073 A1 * | 7/2004 | Hawig et al. | 701/35 |
| 2004/0172614 A1 | 9/2004 | Gallagher | |
| 2004/0194072 A1 | 9/2004 | Venter | |
| 2004/0203731 A1 | 10/2004 | Chen et al. | |
| 2004/0220952 A1 | 11/2004 | Cheenath | |
| 2004/0221292 A1 | 11/2004 | Chiang et al. | |
| 2005/0004727 A1 | 1/2005 | Remboski et al. | |
| 2005/0030202 A1 | 2/2005 | Tsuboi | |
| 2005/0090279 A9 | 4/2005 | Witkowski et al. | |
| 2005/0114832 A1 | 5/2005 | Manu | |
| 2005/0141706 A1 | 6/2005 | Regli et al. | |
| 2005/0144218 A1 | 6/2005 | Heintz | |
| 2005/0163549 A1 | 7/2005 | Shima et al. | |
| 2005/0172123 A1 | 8/2005 | Carpentier et al. | |
| 2005/0246302 A1 | 11/2005 | Lorenz et al. | |
| 2005/0256614 A1 * | 11/2005 | Habermas | 701/1 |
| 2005/0256876 A1 | 11/2005 | Eidson | |
| 2005/0262155 A1 | 11/2005 | Kress et al. | |
| 2005/0281363 A1 | 12/2005 | Qi et al. | |
| 2006/0005177 A1 | 1/2006 | Atkin et al. | |
| 2006/0031850 A1 | 2/2006 | Falter et al. | |
| 2006/0041337 A1 * | 2/2006 | Augsburger et al. | 701/1 |
| 2006/0048145 A1 | 3/2006 | Celli et al. | |
| 2006/0080646 A1 | 4/2006 | Aman | |

| | | |
|---|---|---|
| 2006/0090103 A1 | 4/2006 | Armstrong et al. |
| 2006/0111089 A1 | 5/2006 | Winter et al. |
| 2006/0112183 A1 | 5/2006 | Corson et al. |
| 2006/0121916 A1 | 6/2006 | Aborn et al. |
| 2006/0123396 A1 | 6/2006 | Fox et al. |
| 2006/0143600 A1* | 6/2006 | Cottrell et al. ............... 717/168 |
| 2006/0149746 A1 | 7/2006 | Bansod et al. |
| 2006/0167981 A1 | 7/2006 | Bansod et al. |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |
| 2006/0220900 A1* | 10/2006 | Ceskutti et al. ........ 340/825.22 |
| 2006/0221901 A1 | 10/2006 | Yaqub et al. |
| 2006/0245406 A1 | 11/2006 | Shim |
| 2006/0256008 A1 | 11/2006 | Rosenberg |
| 2006/0272002 A1 | 11/2006 | Wightman et al. |
| 2007/0004432 A1 | 1/2007 | Hwang et al. |
| 2007/0015495 A1 | 1/2007 | Winter et al. |
| 2007/0026871 A1 | 2/2007 | Wager |
| 2007/0103292 A1 | 5/2007 | Burkley et al. |
| 2007/0112773 A1* | 5/2007 | Joyce ............................ 707/9 |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |

OTHER PUBLICATIONS

Bussler, Christoph "The Role of B2B Engines in B2B Integration Architectures", *ACM*, (Mar. 2002),67-72.

Jandl, et al., "Enterprise Application Integration by means of a generic CORBA LDAP Gateway", *ACM*, (May 2002),711.

Sutherland, et al., "Enterprise Application Integration and Complex Adaptive Systems", *ACM*, (Oct. 2002),59-64.

Ballance, et al., "The Pan Language-Based Editing System For Integrated Development Environments", *ACM*, (Oct. 1990),77-93.

Dilts, et al., "An Inteligent Interface to CIM Multiple Data Bases", *ACM, TALIP*, (Mar. 2004),vol. 3 Issue 1, pp. 491-509.

"Non Final Office Action", U.S. Appl. No. 11/086,211, 25 pages.

"Requirement for Restriction/Election", U.S. Appl. No. 11/086,102, (Apr. 6, 2009), 7 pages.

"Non Final Office Action", U.S. Appl. No. 10/975,827, (Apr. 7, 2009),38 pages.

"Final Office Action", U.S. Appl. No. 11/086,120, (Apr. 14, 2009),48 pages.

"Non Final Office Action", U.S. Appl. No. 11/645,292, (Apr. 17, 2009),40 pages.

"Final Office Action", U.S. Appl. No. 11/052,680, (Feb. 13, 2009),117 pages.

Flanagan, Roxy "Graphic + Internet related tutorials Using Winzip", indexed by www.archive.org,(Oct. 30, 2008),8 pages.

"Non Final Office Action", U.S. Appl. No. 11/645,190, (Mar. 13, 2009),41 pages.

"Non Final Office Action", U.S. Appl. No. 11/645,291, (Mar. 13, 2009),41 pages.

"Non Final Office Action", U.S. Appl. No. 11/645,193, (Mar. 16, 2009),41 pages.

"Notice of Allowance", U.S. Appl. No. 11/086,101, (Mar. 23, 2009),20 pages.

"Non Final Office Action", U.S. Appl. No. 11/052,680, (May 6, 2009),28 pages.

"Non Final Office Action", U.S. Appl. No. 11/645,300, (May 11, 2009),21 pages.

"Non Final Office Action", U.S. Appl. No. 11/645,302, (May 11, 2009),21 pages.

"Stuffit Deluxe", Aladdin Systems,(Jan. 1, 2004),83 pages.

Gu, T. et al., "Toward an OSGi-based infrastructure for context-aware applications", U.S. Appl. No. 11/645,190, Pervasive Computing IEEE, vol. 3, Issue 4. Digital Object Identifier 10.1109/MPRV.2004.19,(Oct.-Dec. 2004),9 pages.

Pantic, M et al., "Simple agent framework: an educational tool introducing the basics of AI programming", U.S. Appl. No. 11/645,190, Information Technology: Research and Education, 2003. Proceedings. ITRE2003.,(Aug. 11-13, 2003),426-430.

Singh, V.K. et al., "DYSWIS: An architecture for automated diagnosis of networks", U.S. Appl. No. 11/645,190, Operations and Management Symposium, 2008. NOMS 2008. IEEE,(Apr. 7-11, 2008)851-854.

"Non Final Office Action", U.S. Appl. No. 10/975,146, (May 26, 2009),21 pages.

"Non Final Office Action", U.S. Appl. No. 11/086,102, (Jun. 2, 2009), 18 pages.

"Non Final Office Action", U.S. Appl. No. 11/645,306, (Jun. 4, 2009), 19 pages.

"Non Final Office Action", U.S. Appl. No. 10/975,623, (Jun. 9, 2009), 6 pages.

"Non Final Office Action", U.S. Appl. No. 11/086,121, (Jun. 22, 2009), 32 pages.

"Advisory Action", U.S. Appl. No. 11/086,121, (Sep. 11, 2009), 3 pages.

"Advisory Action", U.S. Appl. No. 11/086,121, (Sep. 11, 2009), 3 pages.

"Final Office Action", U.S. Appl. No. 11/052,680, (Oct. 5, 2009), 16 pages.

"Final Office Action", U.S. Appl. No. 11/086,211, (Sep. 29, 2009), 18 pages.

"Non Final Office Action", U.S. Appl. No. 11/086,120, (Aug. 13, 2009), 35 pages.

"Notice of Allowance", U.S. Appl. No. 11/645,190, (Sep. 17, 2009), 8 pages.

"Notice of Allowance", U.S. Appl. No. 11/645,193, (Sep. 17, 2009), 8 pages.

"Notice of Allowance", U.S. Appl. No. 11/645,291, (Oct. 1, 2009), 11 pages.

Praet, et al., "Processor Modeling and Code Selection for Retargetable Compilation", Jul. 2001, *ACM, TODAES* vol. 6, Issue 3, (Jul. 2001), pp. 277-307.

"Final Office Action", U.S. Appl. No. 11/086,102, (Oct. 20, 2009), 13 pages.

"Final Office Action", U.S. Appl. No. 10/975,146, (Dec. 1, 2009), 11 pages.

"Final Office Action", U.S. Appl. No. 10/975,827, (Nov. 23, 2009), 17 pages.

"Non Final Office Action", U.S. Appl. No. 10/975,623, (Nov. 12, 2009), 17 pages.

Blackwell, John "Remit—Rule-Based Alert Management Information Tool", *Thesis, Florida State University College of Arts and Sciences*, (2004), pp. 1-69.

Lockemann, Peter C., "Agents and Databases: Friends or Foes?", *Proceedings of the 9th International Database Engineering & Application Symposium (IDEAS '05)*, (2005), 11 pages.

"Advisory Action", U.S. Appl. No. 11/086,120, (May 4, 2010), 3 pages.

"Final Office Action", U.S. Appl. No. 11/086,120, (Feb. 23, 2010), 43 pages.

"Final Office Action", U.S. Appl. No. 11/495,053, (Mar. 17, 2010), 17 pages.

"Final Office Action", U.S. Appl. No. 11/052,680, (May 17, 2010), 12 pages.

"Final Office Action", U.S. Appl. No. 11/645,301, (May 12, 2010), 32 pages.

"Final Office Action", U.S. Appl. No. 11/645,303, (May 21, 2010), 32 pages.

"Non Final Office Action", U.S. Appl. No. 10/975,827, (Mar. 25, 2010), 19 pages.

"Non Final Office Action", U.S. Appl. No. 11/645,191, (May 5, 2010), 17 pages.

"Non Final Office Action", U.S. Appl. No. 11/645,192, (May 4, 2010), 14 pages.

"Non Final Office Action", U.S. Appl. No. 11/645,194, (Mar. 26, 2010), 26 pages.

"Non Final Office Action", U.S. Appl. No. 11/645,196, (Apr. 28, 2010), 29 pages.

"Non Final Office Action", U.S. Appl. No. 11/645,198, (Apr. 12, 2010), 14 pages.

"Non-Final Office Action", U.S. Appl. No. 11/052,680, (Feb. 4, 2010), 12 pages.
"Non-Final Office Action", U.S. Appl. No. 11/086,101, (Sep. 2, 2009), 20 pages.
"Non-Final Office Action", U.S. Appl. No. 11/086,102, (Mar. 5, 2010), 15 pages.
"Non-Final Office Action", U.S. Appl. No. 11/086,121, (Dec. 30, 2009), 25 pages.
"Non-Final Office Action", U.S. Appl. No. 11/495,053, (Jun. 10, 2009), 13 pages.
"Non-Final Office Action", U.S. Appl. No. 11/645,195, (Apr. 15, 2010), 20 pages.
"Non-Final Office Action", U.S. Appl. No. 11/645,197, (Feb. 24, 2010), 13 pages.
"Non-Final Office Action", U.S. Appl. No. 11/645,301, (Jan. 6, 2010), 25 pages.
"Non-Final Office Action", U.S. Appl. No. 11/645,303, (Feb. 8, 2010), 18 pages.
"Notice of Allowance", U.S. Appl. No. 10/975,623, (Feb. 23, 2010), 9 pages.
"Notice of Allowance", U.S. Appl. No. 11/086,101, (Feb. 25, 2010), 9 pages.
"Notice of Allowance", U.S. Appl. No. 11/645,292, (Nov. 17, 2009), 9 pages.
"Notice of Allowance", U.S. Appl. No. 11/645,300, (Nov. 18, 2009), 9 pages.
"Notice of Allowance", U.S. Appl. No. 11/645,302, (Nov. 17, 2009), 8 pages.
"Notice of Allowance", U.S. Appl. No. 11/645,306, (Nov. 17, 2009), 8 pages.
"Restriction Requirement", U.S. Appl. No. 11/645,191, (Jan. 28, 2010), 7 pages.
"Restriction Requirement", U.S. Appl. No. 11/645,192, (Jan. 28, 2010), 6 pages.
"Restriction Requirement", U.S. Appl. No. 11/645,198, (Jan. 28, 2010), 6 pages.
"Restriction Requirement", U.S. Appl. No. 11/645,200, (Feb. 26, 2010), 8 pages.
Adnan, Syed et al., "A Survey of Mobile Agent Systems", CSE 221, Final Project, Jun. 13, 2000.,(Jun. 13, 2000), 12 pages.
Baumann, J. et al., "Mole 3.0: A Middleware for Java-Based Mobile Software Agents", (1998), 18 pages.
Bigus, J.P. et al., "ABLE: A toolkit for building multiagent autonomic systems", IBM Systems Journal, vol. 41, No. 3, 2002., 22 pages.
Brandt, Raimund "Dynamic Adaptation of Mobile Code in Heterogenous Environments", Der Teschnischen Universitat Munchen,(Feb. 15, 2001), 76 pages.
Brazier, F.M.T. et al., "Generative Migration of Agents", Department of Computer Science, Faculty of Sciences, Vrije Universiteit Amsterdam; de Boelelaan 1081a, 1081 HV Amsterdam, The Netherlands {frances, bjo, steen, niek} @cs.vu.I,(Aug. 2002), 4 pages.
Bursell, Michael et al., "Comparison of autonomous mobile agent technologies", (May 12, 1997), 28 pages.
Christopoulou, Eleni et al., "An ontology-based context management and reasoning process for UbiComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.
Forte, "Feature Comparison of Agent and Free Agent", Retrieved from: <www.forteinc.com/agent/features.php> on Jan. 26, 2010, (2002), 3 pages.
Hasegawa, Tetsou et al., "Inoperability for mobile agents by incarnation agents", AAMAS; Melbourne, Australia; ACM, 1-58113-683, pp. 1006-1007,(Jul. 14, 2003), 2 pages.
Jih, Wan-Rong et al., "Context-aware Access Control in Pervasive Healthcare", Computer Science and Information Engineering, National Taiwan University, Taiwan. jih@agents.csie.ntu.edu.tw., {r93070, yjhsu} @csie.ntu.edu.tw,(2005), 8 pages.
Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.

Qui-Sheng, He et al., "A Lightweight Architecture to Support Context-Aware Ubiquitous Agent System", Department of Computer Science and Engineering, Fudan University, Shanghai 200433, Chain {hequisheng, sltu} @fudan.edu.cn,(Aug. 2006), 6 pages.
Russell, Stuart et al., "Artificial Intelligence: A Modern Approach", Pearson (2003), pp. 5, 32-56, 449-454.
Stallings, William "ISDN and Broadband ISDN with Frame Relay and ATM", Prentice-Hall, (1999), 5 pages.
Sterritt, Roy et al., "From Here to Autonomicity: Self-Managing Agents and the Biological Metaphors that Inspire Them", Integrated Design and Process Technology, pp. 143-150.,(Jun. 2005), 8 pages.
Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk.,(Aug. 2006), 10 pages.
"Advisory Action", U.S. Appl. No. 11/495,053, (May 26, 2010), 3 pages.
"Final Office Action", U.S. Appl. No. 11/086,102, (Jul. 1, 2010), 14 pages.
"Final Office Action", U.S. Appl. No. 11/086,121, (Jun. 16, 2010), 30 pages.
"Final Office Action", U.S. Appl. No. 11/645,197, (Jul. 19, 2010), 16 pages.
"Non Final Office Action", U.S. Appl. No. 11/645,200, (May 26, 2010), 34 pages.
"Notice of Allowability", U.S. Appl. No. 10/975,146, (Jul. 13, 2010), 2 pages.
Bagci, et al., "Communication and Security Extensions for a Ubiquitous Mobile Agent System (UbiMAS)", In Proceedings of CF 2005, Available at <http://portal.acm.org/ft_gateway.cfm?id=1062302&type=pdf&coll=GUIDE&dl=GUIDE&CFID=91857573&CFTOKEN=53726080>, (May 2005), pp. 246-251.
Karnik, Neeran M., et al., "Security in the Ajanta Mobile Agent System", Softw. Pract. Exper. 31, 4 (Apr. 2001), 301-329,(2001), 28 pages.
Korba, Larry "Towards Secure Agent Distribution and Communication", In Proceedings of the 32nd Annual Hawaii International Conference on System Science - vol. 8 (Jan. 5-8, 1999). HICSS. IEEE Computer Society, Washington, DC, 8059.,(1999), 10 pages.
Poggi, Agostino et al., "Security and Trust in Agent-Oriented Middleware", OTM Workshops 2003: 989-1003,(2003), 15 pages.
Rosenberg, Jonathan et al., "Programming Internet Telephony Services", IEEE Network, (May/Jun. 1999), 8 pages.
Walsh, Tom et al., "Security and Reliability in Concordia", In Mobility: Processes, Computers, and Agents ACM Press/Addison-Wesley Publishing Co., New York, NY, 524-534.,(1999), 10 pages.
"Advisory Action", U.S. Appl. No. 11/052,680, (Jul. 28, 2010), 3 pages.
"Advisory Action", U.S. Appl. No. 11/645,303, (Jul. 28, 2010), 3 pages.
"Non Final Office Action", U.S. Appl. No. 11/645,301, (Jul. 30, 2010), 18 pages.
"Non Final Office Action", U.S. Appl. No. 11/645,303, (Aug. 19, 2010), 20 pages.
"The Sims", Sims, Electronic Arts, (2000), 57 pages.
"WOW, World of Warcraft", Wikipedia (online), Retrieved from Internet in 2010, <URL:http://en.wikipedia.org/wiki/World_of_Warcraft>, (2010), 28 pages.
Barba, Rick "The Sims Prima's Official Strategy Guide", Prima Publishing; ISBN:7615-2339-1, (2000), 98 Pages.
Chang, Yao-Chung et al., "All-IP Convergent Communications over Open Service Architecture", 2005 Wireless Telecommunications Symposium, IEEE, 0-7803-8856, (2005), pp. 202-210.
Hinchey, Michael G., et al., "Formal Approaches to Agent-Based Systems", 2nd International Workshop FAABS, (Oct. 2002), 291 pages.
Taylor, T.L. "Does WoW Change Everything?", Games and Culture, vol. 1, No. 4, (Oct. 2006), 20 pages.

* cited by examiner

SYSTEM, METHOD, AND COMPUTER READABLE MEDIUM FOR PROCESSING A MESSAGE IN A TRANSPORT

BACKGROUND OF THE INVENTION

The present invention is related to message processing, and, more specifically to processing a message in a transport.

There are various instances when a message (such as a data message, a video message, and the like) is sent to a transport (such as a car, a truck, a motorcycle, a train, a boat, and the like) which may be stationary, moving, or temporarily stationary (or temporarily moving). For example, a message containing a software upgrade for a system in a car may be sent via a wireless or a wired manner to the car. In such an instance, the car would receive the message and a decision would be made whether to process such a message. If the decision is to process the message, certain mechanisms would be enacted to ensure proper processing of the message in an efficient and safe manner.

SUMMARY OF THE INVENTION

The present invention provides a system, method, and computer readable medium for processing a message in a transport.

In one embodiment, a method for processing a message in a moving transport comprises receiving a message by a message gateway via a message receiver, receiving the message by a security module from the message gateway, validating the message by the security module, wherein the validating includes at least one of: determining an identity of a sender of the message, determining that the message sender is allowed to send messages to the transport, and receiving the message by a verification module from the security module, and verifying, by the verification module, that the message will be sent to a target module. The determining may further include determining that the message sender has necessary security privileges to allow the message to be processed.

In another embodiment, a system for processing a message in a transport, comprises a first module (such as a message gateway or a device able to perform a similar function), a second module (such as a message receiver or a device able to perform a similar function), wherein the first module receives the message via the second module, a third module (such as a security module or a device able to perform a similar function) that receives the message from the first module, wherein the third module validates the message, and a fourth module that receives the message from the third module, wherein the fourth module verifies that the message will be sent.

In a further embodiment, a computer readable medium comprises instructions for receiving a message by a message gateway via a message receiver, receiving the message by a security module from the message gateway, validating the message by the security module, receiving the message by a verification module from the security module, and verifying, by the verification module, the message, wherein the message consists of header information, and wherein the header information consists of at least one of: authentication and authorization information, a target module identifier identifying the target module for the message, a command identifier for the message identifying the message command, and a message source for the message identifying the source of the message.

DETAILED DESCRIPTION OF THE INVENTION

Figure 1:
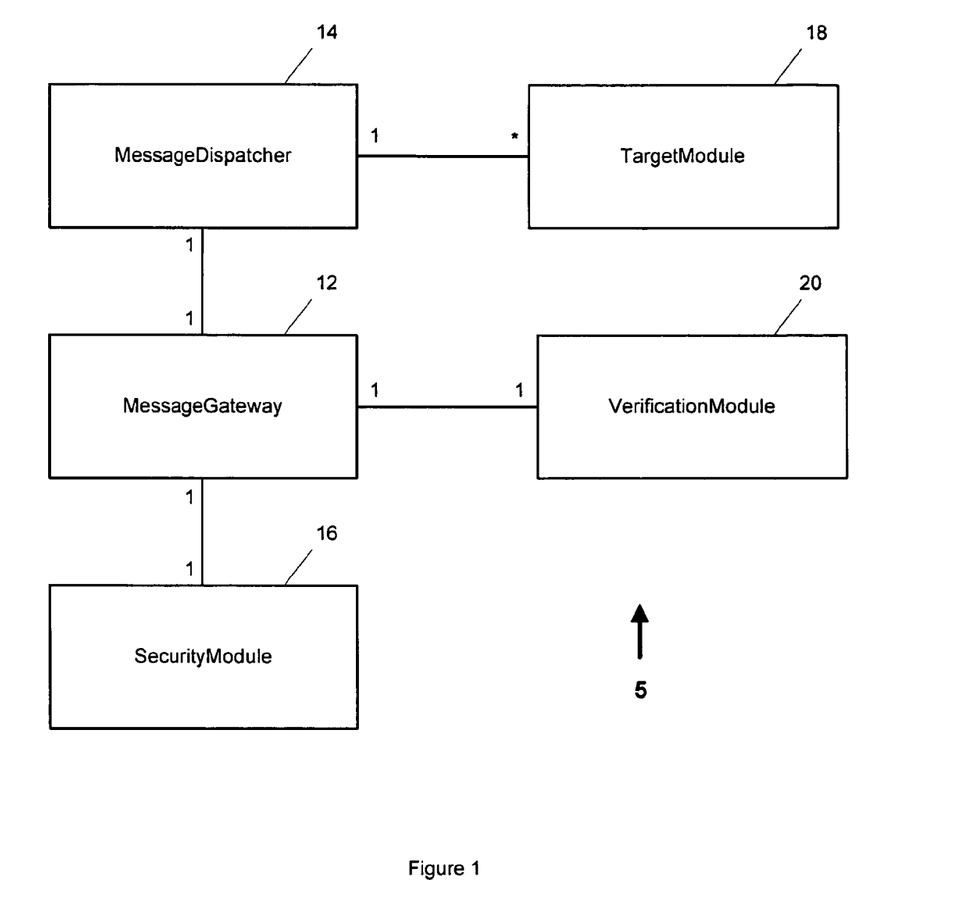
FIG. 1 depicts a first system for processing a message in a transport in accordance with a preferred embodiment of the present invention.

FIG. 1 depicts a system 5 of the present invention. The system 5 is preferably positioned in and/or on a transport but portions of the system can be positioned away from the transport in a fixed location (such as a server in a building) or in a mobile location (such as in and/or on another transport). The system 5 includes a number of modules that are preferably software, but may also be firmware, hardware, or a combination of at least two of: software, firmware, and hardware. These modules consist of a MessageGateway 12, a MessageDispatcher 14, a SecurityModule 16, a TargetModule 18, and a VerificationModule 20. It is important to note that these modules and/or the functionality provided by these modules, can be combined with any of the other modules (either in whole or in part) without departing from the scope of the present invention.

The MessageGateway 12 is coupled to the MessageDispatcher 14, the SecurityModule 16 and the VerificationModule 20. The MessageDispatcher 14 is coupled to the TargetModule 18. Although some of the relationships between the modules are depicted in a certain manner (for example, a one-to-one relationship exists between all of the modules except for the MessageDispatcher 14 and the TargetModule 18 in which a one-to-many relationship exists), the relationships between the modules are descriptive as there may be more than one SecurityModule associated with the MessageGateway, more than one MessageGateway associated with a MessageDispatcher, etc.

Figure 2:
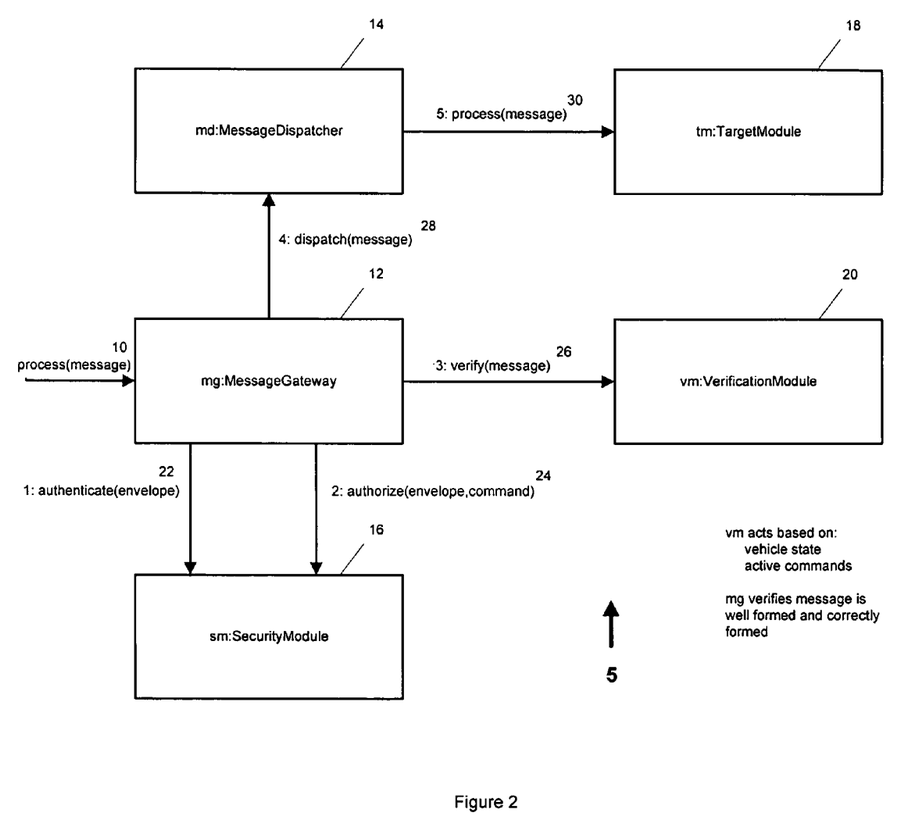
FIG. 2 depicts a more detailed view of the first system in accordance with a preferred embodiment of the present invention.

Referring now to FIG. 2, a more detailed view of the system 5 is depicted. The MessageGateway 12 receives a message 10 and verifies the message is well-formed, meaning that its structure conforms with an expected standard structure. The message is composed of an envelope and a body. In other embodiments, the contents of the envelop may be contained in the body. The envelope consists of security information necessary to authenticate and authorize the message, a command identifier(s), and additional information as necessary to validate the message. The body of the message consists of information specific to the command(s) to be processed. If the message is certified to be well-formed, the MessageGateway 12 passes the message envelope to the SecurityModule 16 to authenticate 22 the message sender. The SecurityModule 16 uses security information contained in the envelope such as a public key, username/password pair, message origination information, or any other security mechanism, to verify that the originator of the message is who they say they are.

If the message is authenticated, the MessageGateway 12 passes the envelope and command identifier to the SecurityModule 16 to authorize 24 the message. The SecurityModule 16 uses security information contained in the envelope such as role information, group identification, etc. to verify the authenticated originator has security privileges necessary for the message to be processed. If the message is authorized, the MessageGateway 12 passes the message to the VerificationModule 20 which verifies 26 that the message can be processed based on the vehicle's current state, sensor indications, location, occupant(s) if any, etc. If the VerificationModule 20 verifies the message, the MessageGateway 12 passes the message 28 to the MessageDispatcher 14. The MessageDispatcher 14 may queue the message for dispatch or dispatch the message immediately. When the MessageDispatcher 14 dispatches the message, it determines the correct TargetModule 18 for the message based on information such as the command identifier, and sends the message 30 to that TargetModule for processing. If no appropriate TargetModule 18 exists, the message may be sent to a default TargetModule, discarded, etc. The MessageGateway 12, the MessageDispatcher 14, the SecurityModule 16, and the VerificationModule 20 may modify the message (change, remove, or add information) as necessary for continued processing of the message.

Figure 3:
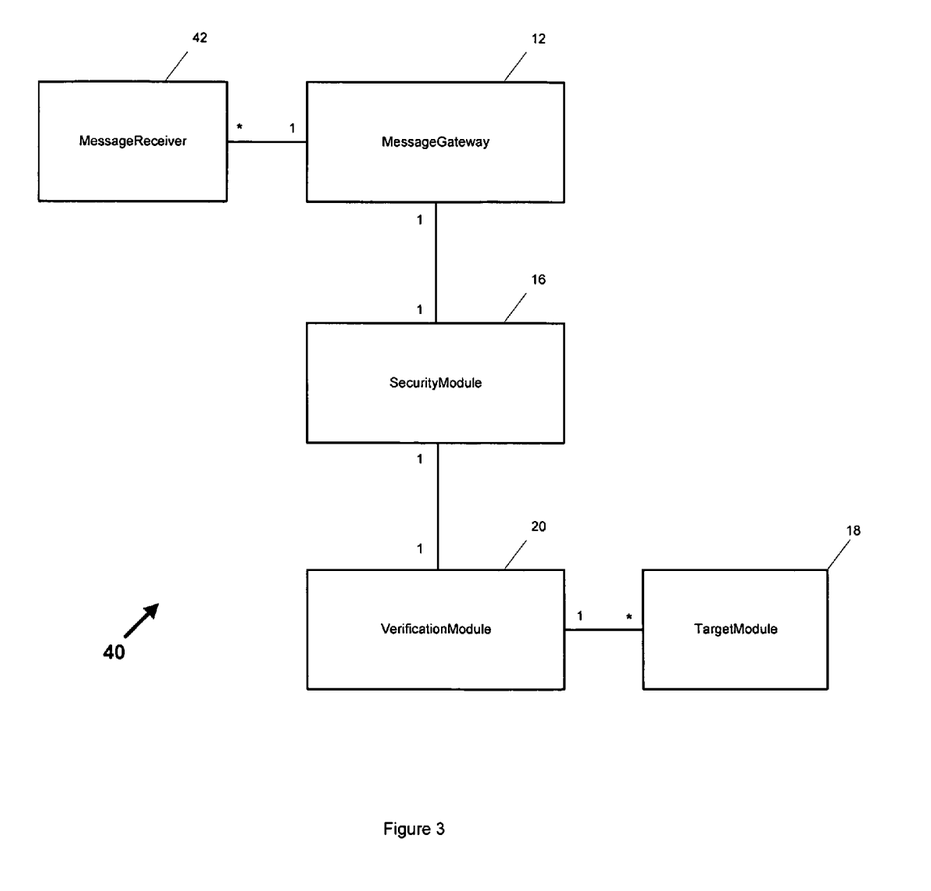
FIG. 3 depicts a second system for processing a message in a transport in accordance with a preferred embodiment of the present invention.

FIG. 3 depicts a system 40 of the present invention. The system 40 is preferably positioned in and/or on a transport but portions of the system can be positioned away from the transport in a fixed location (such as a server in a building) or in a mobile location (such as in and/or on another transport). The system 40 includes a number of modules that are preferably software, but may also be firmware, hardware, or a combination of at least two of: software, firmware, and hardware. These modules consist of a MessageReceiver 42, a MessageGateway 12, a SecurityModule 16, a TargetModule 18, and a VerificationModule 20. It is important to note that these modules and/or the functionality provided by these modules, can be combined with any of the other modules (either in whole or in part) without departing from the scope of the present invention.

The MessageGateway 12 is coupled to the MessageReceiver 42 and to the SecurityModule 16. The VerificationModule 20 is coupled to the SecurityModule 16 and to the TargetModule 18. Although some of the relationships between the modules are depicted in a certain manner (for example, a one-to-one relationship exists between all of the modules except for the MessageReceiver 42 and the MessageGateway 12 and except for the TargetModule 18 and the VerificationModule 20 in which a many-to-one relationship exists), the relationships between the modules are descriptive as there may be more than one SecurityModule associated with the MessageGateway, more than one SecurityModule associated with the VerificationModule, etc.

Figure 4:
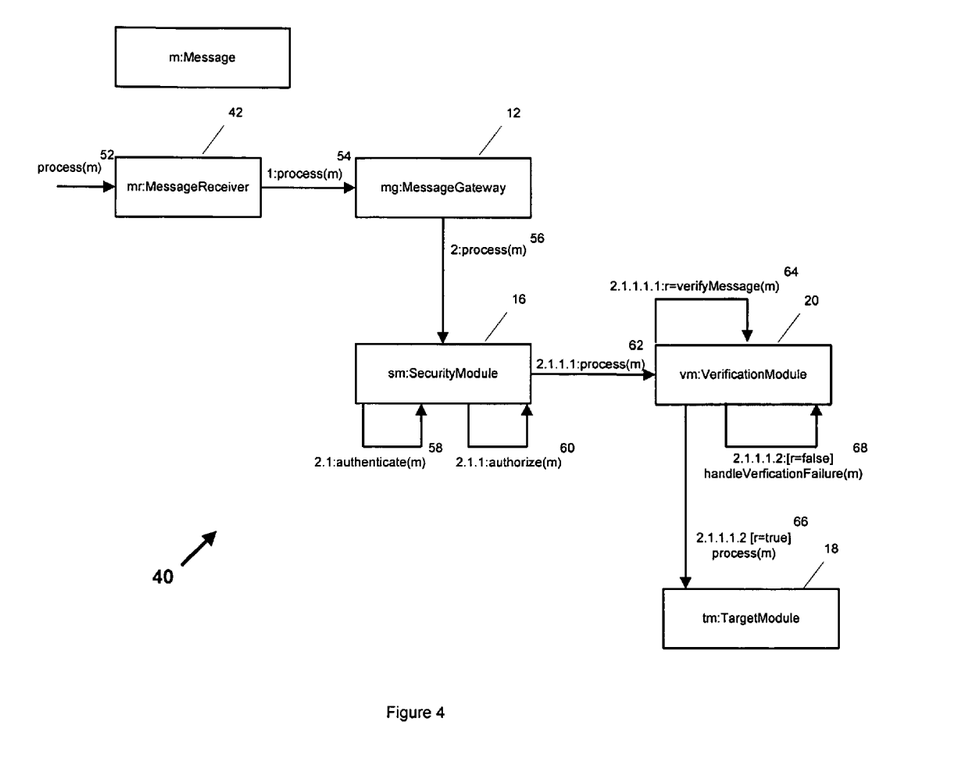
FIG. 4 depicts a more detailed view of the second system in accordance with a preferred embodiment of the present invention.

Referring now to FIG. 4, a more detailed view of the system 40 is depicted. The MessageReceiver 42 receives a message 52 and verifies the message is well-formed, meaning that its structure conforms with an expected standard structure. The message is composed of an envelope and a body. In other embodiments, the contents of the envelop may be contained in the body. The envelope consists of security information necessary to authenticate and authorize the message, a command identifier(s), and additional information as necessary to validate the message. The body of the message consists of information specific to the command(s) to be processed. If the message is certified to be well-formed, the MessageReceiver 42 passes the message envelope 54 to the MessageGateway 12. If the message is certified to be well-formed, the MessageGateway 12 passes the message envelope 56 to the SecurityModule 16 to authenticate 58 the message sender. In this two stage certification process, the check(s) to determine if the message is well-formed can be the same in both stages or can differ from one stage to the next. The SecurityModule 16 uses security information contained in the envelope such as a public key, username/password pair, message origination information, or any other security mechanism, to verify that the originator of the message is who they say they are.

If the message is authenticated, the SecurityModule 16 authorizes 60 the message. The SecurityModule 16 uses security information contained in the envelope such as role information, group identification, etc. to verify the authenticated originator has security privileges necessary for the message to be processed. If the message is authorized, the SecurityModule 16 passes the message to the VerificationModule 20 which verifies 64 that the message can be processed based on the vehicle's current state, sensor indications, location, occupant(s) if any, etc. If the VerificationModule 20 verifies the message, the VerificationModule 20 passes the message 66 to the TargetModule 18. The VerificationModule 20 may queue the message for dispatch or dispatch the message immediately. When the VerificationModule 20 dispatches the message, it determines the correct TargetModule 18 for the message based on information such as the command identifier, and sends the message 66 to that TargetModule for processing. If no appropriate TargetModule 18 exists 68, the message may be sent to a default TargetModule, discarded, etc. The MessageReceiver 42, the MessageGateway 12, the SecurityModule 16, the VerificationModule 20, and the TargetModule may modify the message (change, remove, or add information) as necessary for continued processing of the message.

In one embodiment of the present invention, a method for processing a message in a moving transport comprises receiving a message by a message gateway via a message receiver, receiving the message by a security module from the message gateway, validating the message by the security module, wherein the validating includes at least one of: determining an identity of a sender of the message, determining that the message sender is allowed to send messages to the transport, and receiving the message by a verification module from the security module, and verifying, by the verification module, that the message will be sent to a target module.

The method further comprises sending the message to the target module, if the verification module determines that the message is to be sent and processing the message by the target module, wherein the message gateway verifies that the message is in a proper form for processing, wherein the message receiver may be a cell phone, a GPS device, a radio, a physical connection, or any other device capable of receiving messages from a source external to or within the transport. The message consists of header information which consists of at least one of: authentication and authorization information, a target module identifier identifying the target module for the message, a command identifier for the message identifying the message command, a message source for the message identifying the source of the message, and other header information. In other embodiments, the message consists of data to be passed to the target module.

The validating consists of authenticating and authorizing the message, wherein: the authenticating is used to determine the identity of the message sender, and the authorizing is used to determine that the message sender is allowed to send messages to the transport and has the necessary security privileges to perform the requested command as identified by the command identifier. If the authenticating fails or if the authorizing fails, no further processing of the message is performed, wherein the security module may perform at least one of a following action: ignore the failure, log the failure, notify the transport driver/occupants of the failure through visual or auditory signal, and take other appropriate action. If the authenticating is successful or if the authorizing is successful, the message is received by the verification module. Verifying that the message will be sent to the target module is based on the command identifier for the message in conjunction with at least one of: a transport state, a mode of operation, an external condition, a driver or occupant preferences, a message sender's identity, and a message receiver.

If the message will not be passed to the target module, no further processing of the message is performed, and the verification module may perform at least one of: logging the determination, notifying the transport driver or occupants of the determination through a visual or an auditory signal, and taking other appropriate action. It is important to note that a plurality of the messages can be received, validated, and verified, and wherein at least one of: the message gateway, the message receiver, the security module, and the verification module is on the transport.

In another embodiment of the present invention, a system for processing a message in a transport comprises a first module (such as a message gateway or a device able to perform a similar function), a second module (such as a message receiver or a device able to perform a similar function), wherein the first module receives the message via the second module, a third module (such as a security module or a device able to perform a similar function) that receives the message from the first module, wherein the third module validates the message, and a fourth module that receives the message from the third module, wherein the fourth module verifies that the message will be sent.

In the system, the third module performs at least one of a following action: determines an identity of a sender of the message and determines that the message sender is allowed to send messages to the transport. The transport may be a moving transport and/or a stationary transport.

In a further embodiment, a computer readable medium or software comprises instructions for receiving a message by a message gateway via a message receiver, receiving the message by a security module from the message gateway, validating the message by the security module, receiving the message by a verification module from the security module, and verifying, by the verification module, the message, wherein the message consists of header information, and wherein the header information consists of at least one of: authentication and authorization information, a target module identifier identifying the target module for the message, a command identifier for the message identifying the message command, and a message source for the message identifying the source of the message. The computer readable medium can be stored on any type of storage device in and/or on the transport or off of the transport. Further, the functionality performed by one or more of the modules described herein or additional functionality, can be stored on a personal device (such as a jump drive or personal storage device) and can be placed in and/or on the transport to provide that functionality or the additional functionality. Such additional functionality may include further security information (such as biometric data), further messages (such as special messages that relate to critical functions such an engine's performance), and the like.

Figure 5:
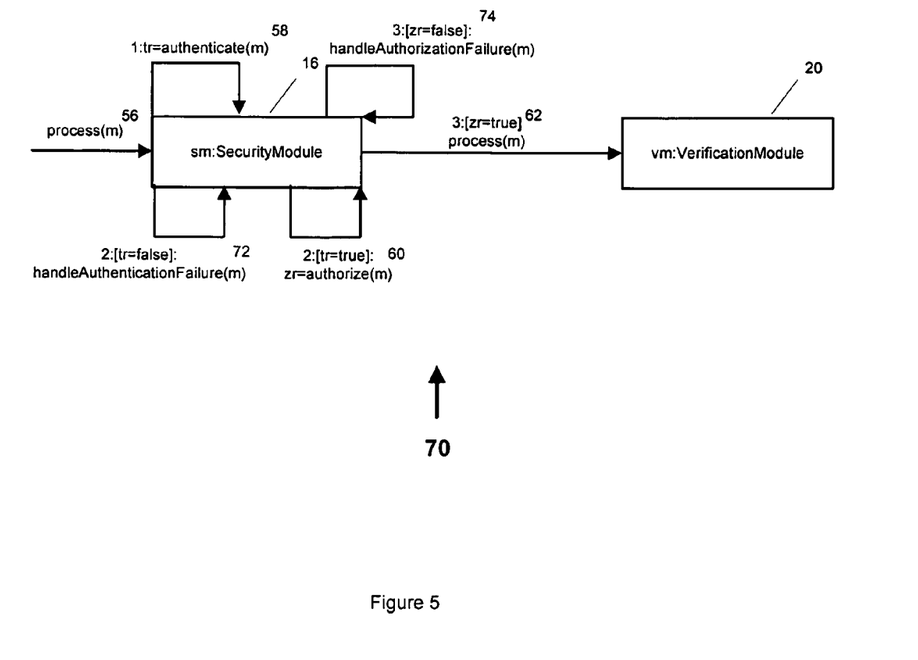
FIG. 5 depicts a more detailed view of the security module and the verification module in accordance with a preferred embodiment of the present invention.

Referring now to FIG. 5, a system 70 is depicted which provides a more detailed view of the security module and the verification module in one embodiment of the present invention. The SecurityModule 16 receives a message envelope 56 and authenticates 58 the message sender. The SecurityModule 16 uses security information contained in the envelope such as a public key, username/password pair, message origination information, or any other security mechanism, to verify that the originator of the message is who they say they are. If the message is authenticated, the SecurityModule 16 authorizes 60 the message. The SecurityModule 16 uses security information contained in the envelope such as role information, group identification, etc. to verify the authenticated originator has security privileges necessary for the message to be processed. If the message is authorized, the SecurityModule 16 passes the message 62 to the VerificationModule 20 which verifies that the message can be processed based on the vehicle's current state, sensor indications, location, occupant(s) if any, etc.

If the SecurityModule 16 receives the message envelope 56 and is unable 72 to authenticate the message sender, at least one module in the system is notified and can take appropriate action. In other embodiments, the SecurityModule 16 can take direct action (for example, the SecurityModule 16 can send a message that is not modified by any other module to an entity (via at least one other module) that sent the initial message to the system. In further embodiments, the SecurityModule 16 may be directly coupled to such an entity and thus can directly send the message to the entity).

If the SecurityModule 16 receives the message envelope 56 and is unable 72 to authorize the message sender, at least one module in the system is notified and can take appropriate action. In other embodiments, the SecurityModule 16 can take direct action (for example, the SecurityModule 16 can send a message that is not modified by any other module to an entity (via at least one other module) that sent the initial message to the system. In further embodiments, the SecurityModule 16 may be directly coupled to such an entity and thus can directly send the message to the entity).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the functionality of the modules can be performed by one or more of the modules in the present arrangement(s), in a distributed architecture and on or via any device able to transfer information between the modules. Further, the information send between the modules can be sent via a wired and/or a wireless means and in real-time, near real-time or in response to a specific event.

What is claimed is:

1. A computer-implemented method for processing a message comprising:
 performing all of the following acts, at least one of which being performed in a movable vehicle:
  receiving a message by a message gateway via a message receiver;
  receiving the message by a security module from the message gateway;
  validating the message by the security module, wherein the validating comprises at least one of:

determining an identity of a sender of the message; or
determining that the message sender is allowed to send messages to the vehicle;
receiving the message by a verification module from the security module; and
verifying, by the verification module, that the message will be sent to a target module, wherein verifying is based upon a current state of the vehicle.

2. The method of claim 1 further comprising sending the message to the target module in response to the verification module determining that the message is to be sent.

3. The method of claim 2 further comprising processing the message by the target module.

4. The method of claim 3 further comprising verifying, with the message gateway, that the message is in a proper form for processing.

5. The method of claim 1, wherein receiving a message via a message receiver includes receiving the message via a message receiver that comprises at least one of: a cellular phone, a GPS device, a radio, a physical connection, or any other device capable of receiving messages from a source external to or within the vehicle.

6. The method of claim 1, wherein receiving a message includes receiving a message that comprises header information and wherein the header information comprises at least one of:
authentication and authorization information;
a target module identifier identifying the target module for the message;
a command identifier for the message identifying one or more message commands; or
a message source for the message identifying a source of the message.

7. The method of claim 1, wherein receiving a message includes receiving a message that comprises data to be passed to the target module.

8. The method of claim 1, wherein the validating comprises authenticating and authorizing the message, and wherein:
the authenticating is used to determine the identity of the message sender; and
the authorizing is used to determine that the message sender is allowed to send messages to the vehicle and has security privileges to perform a requested command as identified by a command identifier.

9. The method of claim 8 further comprising:
discontinuing further processing of the message in response to the authenticating or the authorizing failing; and
upon an authentication failure or an authorization failure, performing at least one of a following action using the security module:
ignoring the failure,
logging the failure, or
generating a notification of the failure through a visual or auditory signal.

10. The method of claim 8 further comprising receiving the message by the verification module in response to the authenticating or the authorizing being successful.

11. The method of claim 1, wherein the verifying that the message will be sent to the target module is further based on a command identifier for the message in conjunction with at least one of:
a mode of operation;
an external condition;
a driver or occupant preferences;
a message sender's identity; or
a message receiver.

12. The method of claim 1 further comprising:
discontinuing processing of the message in response to determining that the message will not be passed to the target module; and
upon a determination that the message will not be passed to the target module, performing at least one of a following action using the verification module:
logging the determination; or
generating a notification of a failure through a visual or an auditory signal.

13. The method of claim 1 further comprising receiving, validating, and verifying a plurality of messages.

14. The method of claim 1, wherein at least two of: the message gateway, the message receiver, the security module, or the verification module are on the vehicle.

15. The method of claim 1, wherein at least one of: the message gateway, the message receiver, the security module, or the verification module is off the vehicle.

16. A system comprising:
one or more processing devices;
a plurality of modules that, responsive to being executed by the one or more processing devices, are configured to enable vehicle message processing comprising:
a first module;
a second module, wherein the first module is configured to receive the message via the second module;
a third module that is configured to receive the message from the first module, wherein the third module is further configured to validate the message; and
a fourth module that is configured to receive the message from the third module, wherein the fourth module is further configured to verify that the message will be sent, wherein message verifying is based upon a current state of a vehicle that is to receive the message.

17. The system of claim 16, wherein the third module is configured to perform at least one of a following action:
determining an identity of a sender of the message; or
determining that the message sender is allowed to send messages to the vehicle.

18. The system of claim 16, wherein the system is configured to process messages for a vehicle that is moving.

19. The system of claim 16, wherein the system is configured to process messages for a vehicle that is stationary.

20. One or more computer readable storage devices having stored thereon, computer executable instructions that, responsive to being executed by one or more devices of a message processing system, cause the message processing system to perform operations comprising:
receiving a message by a message gateway via a message receiver;
receiving the message by a security module from the message gateway;
validating the message by the security module;
receiving the message by a verification module from the security module; and
verifying, by the verification module, the message, wherein verifying is based upon a current state of a vehicle to which the message is directed;
wherein the message comprises header information; and
wherein the header information comprises at least one of:
authentication and authorization information;
a target module identifier identifying a target module for the message;
a command identifier for the message identifying a message command; or
a message source for the message identifying a source of the message.

21. The system of claim 16, wherein the first module, the second module, the third module, and the fourth module are each embodied on a tangible computer readable storage medium.

22. The one or more computer readable storage devices of claim 20, wherein the computer executable instructions, responsive to being executed by the one or more devices of the message processing system, further cause the message processing system to perform operations comprising:
sending the message to the target module, in response to the verification module determining that the message is to be sent;
processing the message by the target module; and
verifying, with the message gateway, that the message is in a proper form for processing.

23. The one or more computer readable storage devices of claim 20, wherein the message receiver comprises at least one of: a cell phone, a GPS device, a radio, a physical connection, or any other device capable of receiving messages from a source to or within the vehicle.

24. The one or more computer readable storage devices of claim 20, wherein the message comprises data to be passed to the target module.

25. The one or more computer readable storage devices of claim 20, wherein the computer executable instructions, responsive to being executed by the one or more devices of the message processing system, further cause the message processing system to perform operations comprising:
validating the message by the security module by authenticating and authorizing the message, wherein authenticating is used to determine an identity of a message sender, and the authorizing is used to determine that the message sender is allowed to send messages to the vehicle and has security privileges to perform a requested command as identified by the command identifier.

26. The one or more computer readable storage devices of claim 20, wherein the computer executable instructions, responsive to being executed by the one or more devices of the message processing system, further cause the message processing system to perform operations comprising:
discontinuing further processing of the message if authentication fails or if authorization fails; and
upon an authentication failure or an authorization failure, performing at least one of a following action using the security module:
ignoring the failure,
logging the failure, or
generating a notification of the failure through a visual or auditory signal.

27. The one or more computer readable storage devices of claim 20, wherein the computer executable instructions, responsive to being executed by the one or more devices of the message processing system, further cause the message processing system to perform operations comprising:
receiving the message by the verification module if authentication is successful or if authorization is successful.

28. The one or more computer readable storage devices of claim 20, wherein the computer executable instructions, responsive to being executed by the one or more devices of the message processing system, further cause the message processing system to perform operations comprising receiving, validating, and verifying a plurality of messages.

29. The one or more computer readable storage devices of claim 20, wherein at least one of: the message gateway, the message receiver, the security module, or the verification module is on the vehicle.

30. The one or more computer readable storage devices of claim 20, wherein at least one of: the message gateway, the message receiver, the security module, or the verification module is off the vehicle.

* * * * *